(12) United States Patent
Shirk et al.

(10) Patent No.: US 7,647,774 B2
(45) Date of Patent: Jan. 19, 2010

(54) CRYOGENIC COGENERATION SYSTEM

(75) Inventors: Mark Alan Shirk, Palmdale, CA (US);
Gary A. Storck, Jr., San Jose, CA (US);
Wesley W. Welgel, Cupertino, CA (US)

(73) Assignee: Blue Earth Energy, Inc., Sunnyvale, CA (US)

( * ) Notice: Subject to any disclaimer, the term of this patent is extended or adjusted under 35 U.S.C. 154(b) by 112 days.

(21) Appl. No.: 11/100,197

(22) Filed: Apr. 5, 2005

(65) Prior Publication Data
US 2005/0198961 A1  Sep. 15, 2005

Related U.S. Application Data

(63) Continuation of application No. 10/961,942, filed on Oct. 8, 2004, now abandoned.

(60) Provisional application No. 60/511,292, filed on Oct. 14, 2003.

(51) Int. Cl.
*F01K 25/08* (2006.01)

(52) U.S. Cl. .......................................... 60/651; 60/671

(58) Field of Classification Search .................. 60/651, 60/671, 670
See application file for complete search history.

(56) References Cited

U.S. PATENT DOCUMENTS

| | | | | | |
|---|---|---|---|---|---|
| 4,313,305 | A | * | 2/1982 | Egosi | 60/648 |
| 4,622,472 | A | * | 11/1986 | Bronicki | 290/52 |
| 5,129,236 | A | * | 7/1992 | Solomon | 62/324.1 |
| 5,336,059 | A | * | 8/1994 | Rowley | 417/348 |
| 5,617,739 | A | * | 4/1997 | Little | 62/619 |
| 6,176,102 | B1 | * | 1/2001 | Novak et al. | 62/612 |
| 6,415,628 | B1 | | 7/2002 | Ahmed | |

* cited by examiner

*Primary Examiner*—Hoang M Nguyen
(74) *Attorney, Agent, or Firm*—Law Office of Wendell J. Jones

(57) ABSTRACT

A cryogenic and thermal source cogeneration method for converting energy from a heat source, through a cryogenic heat transfer process, into mechanical and/or electrical energy, comprising, utilizing a vapor compression cycle (2) to absorb heat from the heat source and, utilizing a Rankine cycle (4) for energy transfer, for converting thermal energy to mechanical and/or electrical energy.

53 Claims, 10 Drawing Sheets

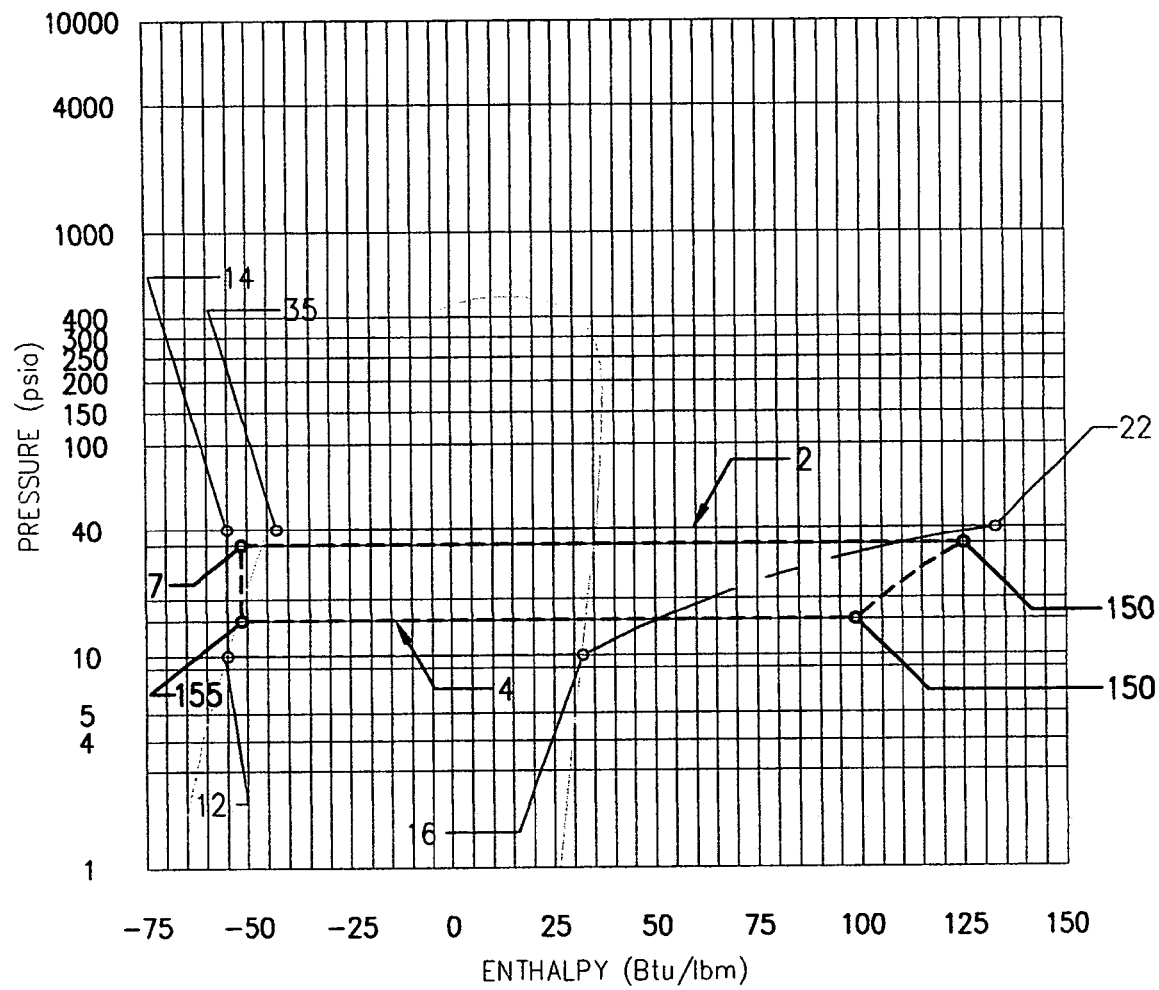
FIG. 1-A

CRYOGENIC COGENERATION SYSTEM

RELATED APPLICATION(S)

This continuation application claims the benefit of the earlier filed U.S. patent application Ser. No. 10/961,942 entitled "Cryogenic Cogeneration System" filed Oct. 8, 2004 now abandoned. The earlier filed application is related to and claims priority from U.S. Provisional Patent Application Ser. No. 60/511,292, filed Oct. 14, 2003.

TECHNICAL FIELD

This invention relates to methods and apparatuses for converting thermal energy to mechanical and/or electrical energy.

BACKGROUND ART

Heretofore, numerous methods and apparatuses have been developed for production of mechanical and electrical energy, however difficulties and limitations are inherent in all of them. For example, electrical power plants utilizing high priced fossil fuel to generate electricity are emitting greenhouse gases that scientists claim to be the greatest contributor to the global warming problem. It is predicted that this will have a significant negative impact on our environment within the next 50 years.

Plants utilizing dams/water reservoirs, to produce hydroelectricity, also will impact our environment due to the necessity to flood surrounding inhabited land resources. In addition, water resources are depleted to suffice electrical demands.

The accidents in Chernobyl, in the Soviet Union, and 3 Mile Island, in the United States, have proven Nuclear power through history to be very unhealthy and potentially fatal to people within surrounding areas. An effective means of disposing nuclear waste has not been established. Nuclear power, still consumes uranium, and has limited capacity due to the necessity to operate at lower pressures for safety reasons.

Chlorofluorohydrocarbon (CFC) emissions from existing refrigeration and air conditioning systems have been depleting our Earth's ozone layer, which is believed to be the cause of many illnesses attributed to harmful radiation entering our atmosphere.

Further, growing problems associated with energy production and supplies that are continuing to decrease the health of our planet include negative effects as a result of the greenhouse effect, the depletion of the Earth's ozone layer, nuclear waste disposal, and the many other adverse effects, including loss of life and land, that are attributed to the fossil fuel industry (war, oil tanker spills, offshore drilling, land destruction as a result of coal mining, etc.) and land flooding from the building of dams. Economic problems also will continue to grow as consumable energy resources become more scarce and as a result of the cost of the necessary upgrading of old, power generation and grid systems in developed countries.

In addition, as China's and India's industrial development continues to grow at an accelerated pace power consumption and demand increases. Experts anticipate that China alone will soon consume more oil than the United States. Present estimates by experts are that our planet's oil resources will deplete within 32 years.

Fossil fuel burning, and many other presently known mechanical engines in use today also present problems for the defense Industry. One problem is that all of these engines release residual heat that is detectable by the infrared heat sensors.

Many other technologies have been developed to try to solve the problem of finding an environmentally friendly, safe, and economically efficient method to generate electricity, achieve energy consuming mechanical functions (i.e. for transportation, industrial manufacturing, etc.) and provide refrigeration, cooling, and air conditioning functions. The following is a list of some of those technologies and some of their associated benefits and liabilities:

(a) Bio Mass generation is another way to produce electricity than coal and oil burning power generation plants. But as fossil fuel plants do, bio mass generation also emits harmful gases into our atmosphere, again negatively impacting our environment.

(b) Wind turbine generation is probably the best existing technology implemented today but has limited capacity capabilities, requires considerable initial investments, utilizes considerable amount of land and it is not aesthetically pleasing to many. It is also dependent on weather conditions and geographical locations.

(c) Solar thermal and solar photovoltaic power generation is limited due to its dependency on weather conditions and availability of sunlight. Collector arrays again have to consume large surface areas of property to generate a reasonable amount of power. This is attributed to the fact that solar rays produces a limited amount of Btu's per sq. ft depending upon the time of day and geographical location. This also requires extra expense and maintenance costs attributed to the necessary installation of large thermal or chemical energy storage systems, that are typically coupled with them.

(d) Hydrogen Fuel Cells do not emit harmful gases into our atmosphere but other hazardous conditions exist due to the extremely explosive properties of hydrogen. Also unlike biomass, wind turbines, and solar, this alternative requires consumption of hydrogen and it is not economically efficient to completely modify our infrastructure to make our society dependent on hydrogen, as it is, dependent on fossil fuel today. Present technology requires costly energy consumption to liquefy the hydrogen.

(e) Several cryogenic energy systems utilizing an expansion engine have been proposed. For example, in U.S. Pat. No. 4,170,116, a method and apparatus for converting thermal energy to mechanical energy is disclosed. In U.S. Pat. No. 4,896,515, a heat pump energy recovery method and method of curtailing power for driving a compressor in a heat pump is disclosed. However, both these technologies require mechanical motor driven compressor(s) and/or pump(s) that consume more energy than the system can produce in net shaft work output which requires an external power generation source for supplemental energy input, and the internal latent heat of the system is rejected to an external heat sink rendering it wasted energy. In U.S. Pat. No. 4,624,109 a condensing atmospheric engine is disclosed. The technology proposes to inject and/or extract air directly from the atmosphere into a specially designed vacuum chamber maintaining a deep vacuum created by a mechanical vacuum pump supplemented by an expansion engine. The air is isentropic ally expanded to stimulate a phase transformation of condensation to a solid state which is also assumed to supplement the vacuum process and provide a latent heat sink. In SAE Series # 981898 and # 972649 technical papers on the Quasi-Isothermal Expansion Engine and appurtenances that power the Cryocar LN2000 developed by the University of Washington, disclose an engine using liquid air and combustible fuel. In U.S. Pat. No. 3,681,609, a non-polluting motor, including cryogenic fluid as the motive means is disclosed. Significant problems and limitations accompany all such technology, For example, the Cryocar LN2000 extracts stored liquid nitrogen an open loop system which consists of an evaporator, superheater and an expansion engine to create shaft work coupled to propel and/or power the vehicle. The residual sensible and latent heat and all the nitrogen is wasted as it is exhausted to the atmosphere. Therefore, the liquid nitrogen is consumed and has to be replenished. In similarity to the hydrogen fuel cell technology, this system, as it is presently developed, is not economically efficient. Further, being that it requires completely modifying our infrastructure to make our society dependent on nitrogen, as opposed to the current dependency on fossil fuel today, its practicality is very limited. Further, such prior technology requires costly energy consumption, that can include fossil fuel, to liquefy the nitrogen.

Accordingly, several objects and advantages of our the present cryogenic cogeneration system are:
(a) to provide a closed loop system that generates power/mechanical energy without emitting any harmful gasses to the atmosphere, while providing a heat sink for other applications, and does not require an additional heat sink.
(b) to provide an independent system with minimal/limited land use needed and no requirements for specific geographic locations and weather conditions.
(c) to provide a safe system that can operate with inert, non-explosive, non-poisonous gases.
(d) to provide a system that does not directly and/or indirectly consume and deplete scarce/non-renewable energy resources for its operation and will also provide the opportunity for society to be independent of consumable resources.
(e) to provide a natural convection, thermosiphonic iso/exothermal compression process in the vapor compression cycle requiring only free thermal energy input to achieve the necessary work. After the free thermal energy is converted to work, the residual sensible and latent heat energy and the refrigerant medium can be recycled as it is condensed from the vapor and/or gas state back into the liquid state, allowing energy conservation, and minimizing society's dependency on the existing expensive consumable energy infrastructure.

Further objects and advantages are to provide the ability for almost any medium that contains thermal energy to provide the energy input to the system to produce net work output; to provide the conversion of thermal energy (heat) to mechanical and/or electrical energy; to provide an inexpensive, environmentally safe alternative form of transportation, with only renewable energy consumption. The method and apparatus can be applied to trucks, trains, ships, planes, and the like; to provide electricity; to provide environmental control systems, for example air conditioning, refrigeration, cryogenics, and the like. The present invention can be utilized in cryogenic applications for liquefaction of gases such as nitrogen, hydrogen, helium, methane, and the like; laboratory and semiconductor applications, and medical applications (such as cryonics, etc), which reduce the expensive costs of electricity consumption that is presently needed for existing systems. Still further applications include use in power plants, where such technology is scalable up to the largest multi-megawatt power generation plant that mankind can conceive and construct. Specific geographical locations, environmental hazards, fossil fuel and/or water consumptions are not necessary. All that is needed is air or other equivalent heat source(s). The present system may also be used to provide cogeneration for many industrial facilities and computer server farms have large quantities of waste heat that has been, in most cases, a liability to operations. With the subject technology, these liabilities can be turned into an asset while becoming a supplemental heat source to generate power. The disclosed technology can also partner with existing renewable energy projects such as solar, bio-mass, geo-thermal, etc., competitively increase their capacity to far exceed the capacities of existing fossil fuel power generation facilities.

As well as a mobile power source, (eliminating the need to carry and replenish fuel supplies), the subject technology can be combined with other new technologies recently conceived. For example, such technology creates an opportunity to enhance replace existing rotocraft technology by decreasing diameters of propellers/rotors and still lift the same amount of weight that the larger propellers/rotors lift today. Such technology may also be used to provide water distillation/purification, extraction and reserve storage.

With the cryogenic cogeneration system and thermal source cogeneration disclosed herein, including both method and apparatus, the environment is safe from emissions, hazardous waste, flooding of valuable property and no particular geographic location is necessary to implement it. This system consumes no water, no fuel, no storage, and no chemical treatment and is not dependant on weather conditions. It can also be utilized in water, land, and aerospace transportation systems.

Additional objects and advantages of the invention will be set forth in the description which follows, and in part will be obvious from the description, or may be learned by practice of the invention. The objects and advantages of the invention may be realized and obtained by means of apparatus, methods, and combinations particularly pointed out in the appended claims.

DISCLOSURE OF INVENTION

The present invention is a cryogenic cogeneration method and a thermal source cogeneration system for converting energy from a heat source, through a cryogenic or thermal source heat transfer process, into mechanical and/or electrical energy utilizing a vapor compression cycle to absorb heat from a heat source, and utilizing a Rankine cycle for energy transfer, for converting thermal energy to mechanical and/or electrical energy. The two cycles preferably operate as closed loops and complement each other's cycle. A cryogenic cogeneration apparatus and a thermal source cogeneration apparatus for converting energy from a heat source, through a cryogenic or thermal source heat transfer process, into mechanical and/or electrical energy is also disclosed, comprising, vapor compression cycle mechanisms to absorb heat from the heat source, and Rankine cycle mechanisms for energy transfer, for converting thermal energy to mechanical and/or electrical energy, the Rankine cycle mechanisms being operably linked to the vapor compression cycle mechanisms.

BRIEF DESCRIPTION OF DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1A shows one example of the many possible ranges of parameters within a pressure and enthalpy diagram for the proposed cryogenic or thermal source cogeneration system, according to the invention.

FIG. 2-1 and 2-2, shows embodiments including modified versions of a vapor compression cycle and a Rankine cycle with a liquid mechanical pump added to the Rankine cycle, a passive parallel compressor superheater assembly, blowdown expansion engine, and blowdown heat sink incorporated into the vapor compression cycle, according to the invention.

FIG. 3-1 and 3-2 show an optional summary of additional embodiments including the modified versions of the vapor compression cycle and the Rankine cycle with the liquid mechanical pump added to the Rankine cycle, the passive parallel compressor superheater assembly, a blowdown vacuum diffusion injector system, a blowdown cycle, and a blowdown vacuum heat sink, according to the invention.

FIG. 4-1 and FIG. 4-2 show an optional additional embodiment including a passive parallel reducing volume compressor subsystem with flow inducing heat exchangers, according to the invention.

FIG. 5-1 and FIG. 5-2 show an optional additional embodiment including the vapor compression cycle and/or the Rankine Cycle utilizing existing motorized mechanical driven pumps, compressors, and blowers for flow circulation and an optional desiccant dehumidification system(s) that can regenerate via the use of an optional solar collector array, according to the invention.

BEST MODE FOR CARRYING OUT THE INVENTION

Figure 1:
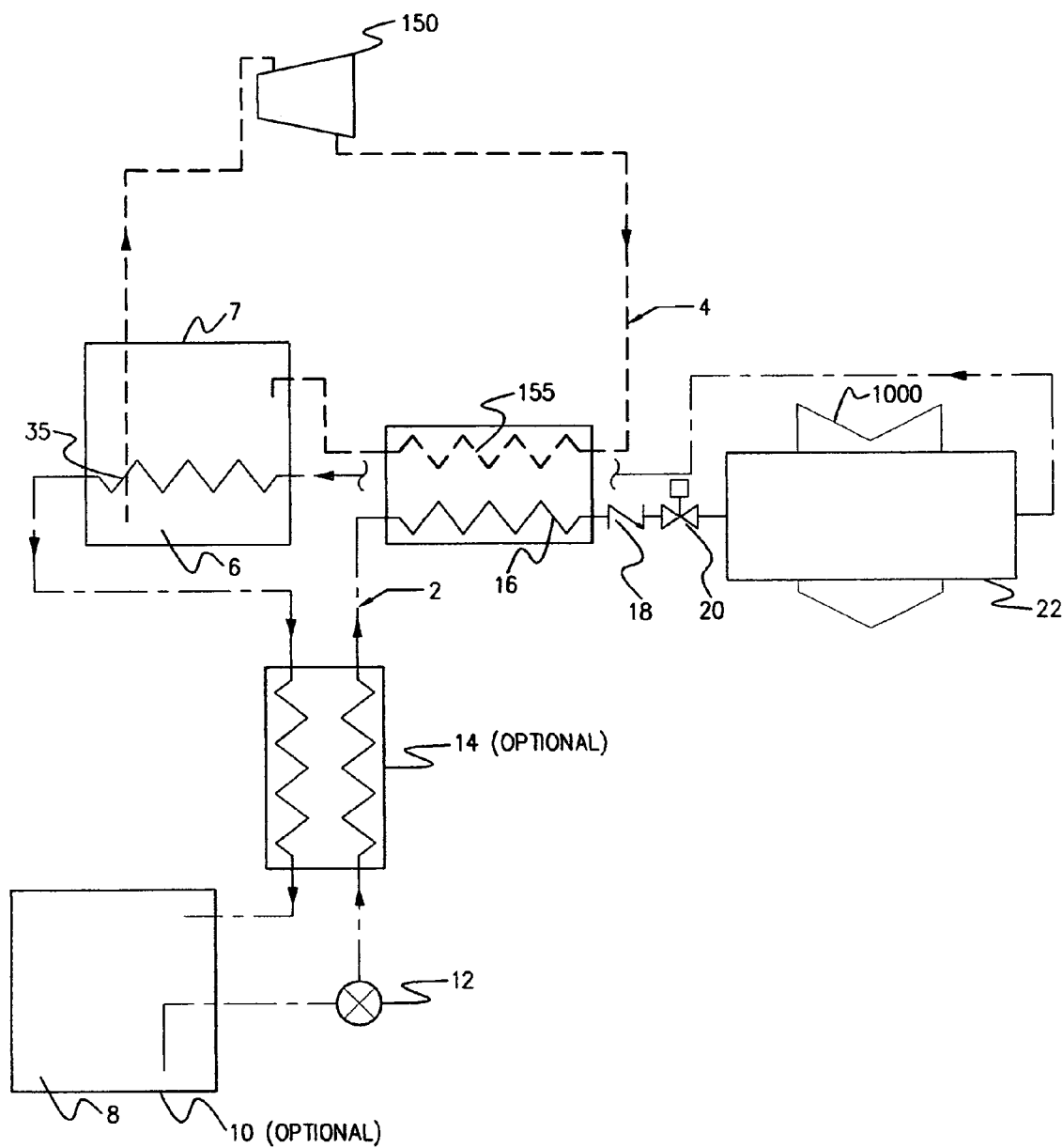
FIG. 1 shows, in a preferred embodiment, a cryogenic cogeneration or thermal source system having a vapor compression cycle and a Rankine Cycle, according to the invention.

Reference will now be made in detail to the present preferred embodiments of the invention as illustrated in the accompanying drawings.

The cryogenic and thermal source cogeneration system of the present invention includes both method and apparatus including an array of heat exchanger(s), flow regulation device(s), compression system(s) and expansion engines that are assembled to integrate synchronized thermodynamic and non thermodynamic processes for the extraction of heat from geo-thermal (natural internal heat sources below the surface of the earth) or solar-thermal (natural heat sources above the Earth's surface) energy sources and for the conversion of this thermal energy (heat) into mechanical energy. This system may be utilized primarily to drive generators for the production of electricity but other applications include benefits from the net mechanical work produced by this system. This system also has many cogeneration applications that can be utilized as an attribution to the system's heat extraction and heat rejection capabilities. By using two cycles this allows for example, the liquefaction, evaporation, and then the re-liquefaction of a heat transfer medium by recycling latent heat.

This disclosed cryogenic cogeneration and thermal source system is preferably comprised of two sub-assemblies, the vapor compression cycle 2, and the Rankine cycle 4. The method and apparatus disclosed herein allows for a controlled and adjustable liquid, vapor, and/or gas flow within all cycles in the system. Any external heat source may be used, which may be natural such as geothermal or solar, or manmade, by which the present method and apparatus convert energy from the heat source into mechanical and/or electrical energy.

In the preferred embodiment, the primary method and means to receive heat from the external heat source, is the vapor compressor cycle, 2. This heat is then preferably transferred to the Rankine cycle 4, where the heat energy is converted to mechanical or electrical energy, as disclosed herein. The two cycles and the methods and apparatus for implementing them, are configured and operated to complement and complete each other by hardware and/or software means.

The vapor compression cycle may be implemented in many ways, with the preferred method and apparatus described. In general, the vapor compression cycle starts with a liquid receiver, with a refrigerant in liquid form, but may be in gas or vapor form, is expanded through a metering device, to help sub cool its circuit through a sub cooler at the end of its cycle, and absorbs heat from the Rankine cycle (so as to condense the Rankine cycle) through the Rankine cycle condenser. The vapor compression refrigerant then runs through a compressor/superheater assembly, to boost pressure and absorb the heat from an external heat source, and then transfers heat to the Rankine cycle, which superheats the Rankine cycle refrigerant and condenses the vapor compression cycle refrigerant, and is then sub cooled via the aforementioned heat exchanger. Preferably compression/pressurization is accomplished by filling the superheater compressors with slightly superheated refrigerant, and adding heat from the external heat source where the fixed volume increases the temperature and pressure of the refrigerant until it reaches the desired levels and is released. In such embodiments, multiple vapor compression superheaters/compressors 22 and 60, are configured in parallel and sequenced to minimize pulsations that would result from isolation of the superheaters/compressors 22, and 60, to accommodate the process. Expansion tanks 11, also may be provided to reduce pulsing and provide a more constant flow.

An embodiment is also described here, where a blowdown is provided to evacuate the remainder of the high pressure/temperature that remains in the superheaters/compressors 22, and 60, after they are evacuated to complete their cycle and add the heat to the Rankine cycle. To reintroduce this blowdown into the system, as opposed to discharging into the atmosphere, the blowdown gasses are expanded through another expansion engine, where a mechanical or electrical output can be realized, to match the inlet pressure to the compressors. The blowdown gasses may then be run through a heat exchanger to eventually transfer heat into the Rankine cycle so as to also match the temperature of the other gasses being introduced into the compressors.

Alternatively, additional superheaters/compressors 810, 820, and 830, may be provided in each circuit where volumes are successively reduced to enhance the compression/pressurization. Such superheaters/compressors can be provided with heating and cooling sources to induce the flow of refrigerant from one superheater/compressor to another, in lieu of the previously mentioned blowdown; however, it may be desired to incorporate blowdowns into this configuration as well.

Preferably, Rankine cycle 4, also starts out with a liquid receiver, a pump for pumping the liquid from the receiver, which adds pressure to the liquid, into heat exchanger to absorb heat from the vapor compression cycle, from its main condenser, blowdown and/or its compressor, until the Rankine cycle refrigerant has reached a superheated state where it is then expanded through a expansion engine to obtain mechanical or electrical output, and is re-condensed by being cooled by the vapor compression cycle.

In the embodiments described in detail below, the preferred liquid refrigerant is nitrogen, however, other refrigerants may be used if desired.

In FIG. 1, the vapor compression cycle 2, and means for implementing the cycle are shown. As depicted in FIG. 1, the vapor compression cycle can begin with, but is not limited to, an optional vapor compression liquid reservoir receiver, 10, for holding vapor compression cryogenic refrigerant 8, which may be any refrigerant but preferably liquid nitrogen. Refrigerant 8, however, may be other refrigerants, but preferably cryogenic refrigerants, or others, such as methane, or the like. Refrigerant 8, may be in the liquid phase, gas phase, or vapor phase in this cycle. Reservoir receiver 10, leads to a vapor compression expansion valve/metering device, or pressure reducing valve, 12, into an optional vapor compression subcooler 14, and into a Rankine condenser 155, that can be a subassembly to a cryogenic shell and tube heat exchanger preferably exiting to an optional check valve 18, and/or an automated isolation valve 20, preferably connected to a vapor compression superheater/compressor 22, in thermal conductive contact with external heat source 1000. Superheater/compressor 22, is preferably exited to a vapor compression condenser 35, in thermally conductive contact with the Rankine cycle refrigerant 6, preferably in the liquid phase occupying a Rankine cycle liquid evaporator reservoir 7, that can be a subassembly to a heat exchanger, and then passes back through the subcooler 14, and into the receiver 10, in the preferred methodology.

Also depicted in FIG. 1, the Rankine cycle 4, and means for implementing the cycle are shown, preferably starts at an optional Rankine cycle liquid evaporator/superheater reservoir 7, with Rankine cycle refrigerant medium 6, which is preferably cryogenic. Refrigerant medium 6, may be any refrigerant, but preferably a cryogenic refrigerant such as liquid nitrogen, and is in thermally conductive contact with the vapor compression condenser 35, as a subassembly to a cryogenic and tube heat exchanger. Refrigerant 6, may be in the liquid phase, gas phase, or vapor phase in this cycle. Reservoir/receiver 7, connected to an array of piping and appurtenances leads to a Rankine cycle expansion engine 150, and discharging into a Rankine cycle condenser 155, which is in thermally conductive contact with the vapor compression evaporator 16, as a subassembly to a cryogenic shell and tube/tube and tube heat. Refrigerant 6, then passes back to the reservoir 7, in the preferred methodology.

In the preferred operation of vapor compression cycle 2, natural head from gravity can provide the pressure upon the liquid within the vapor compression liquid reservoir receiver 10. This head pressure can induce flow through the vapor compression expansion valve/metering device/pressure-reducing valve 12, as the refrigerant is discharged/released to a lower pressure within a preferably vertical positioned vacuum. It will simultaneously absorb latent heat from the optional vapor compression subcooler 14, and/or from the Rankine cycle condenser 155, as it passes through its vapor compression evaporator 16. After the refrigerant medium 8, is fully vaporized and slightly superheated it can continue to absorb sensible heat from an external source as the medium 8, travels through the vapor compression superheater 22, in thermal conductive contact with external heat source 1000. Being superheated at a constant and/or reduced volume, this thermal expansion process will simultaneously increase the refrigerant medium's pressure and reduce it's density forcing it to rise, replace and transfer heat to denser atoms and/or molecules of medium 8 until a near equilibrium temperature and density is reached throughout. Hence, the buoyant, compressed/pressurized and superheated medium 8, will be induced to flow upward via vertical piping 28, into the vapor compression condenser 35, located at a calculated higher elevation. Medium 8, can then proceed to conduct and release its latent and sensible heat enthalpy to the Rankine cycle liquid evaporator superheater reservoir 7, until medium 8, condenses into the liquid state. This inverted process again increases the density of the liquid medium 8, and gravity induces the flow downward back through the subcooler 14, and into the receiver 10 to complete the vapor compression cycle, 2. Hence, being that the system is described closed loop, (but it is not limited to this configuration, as it can be open loop or many other configurations), displacement can cause a vacuum void to occur in the vapor compression evaporator 16, the vapor compression superheater 22, in thermal conductive contact with external heatsource 1000, and the vapor compression condenser 35. This can stimulate continued thermosiphonic flow back through the expansion valve 12, via natural convection.

Figures 1, 2:
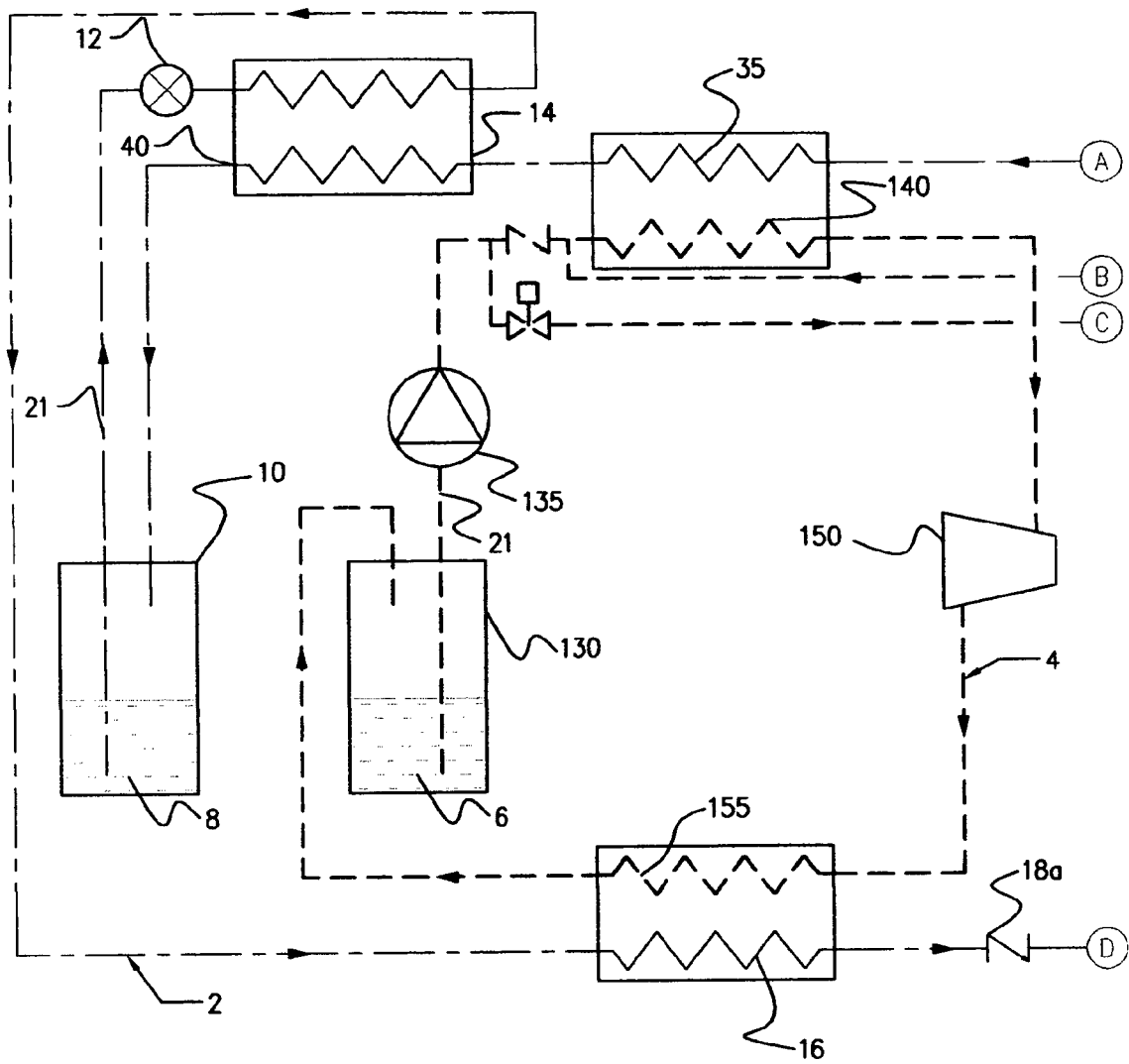
Figure 2:
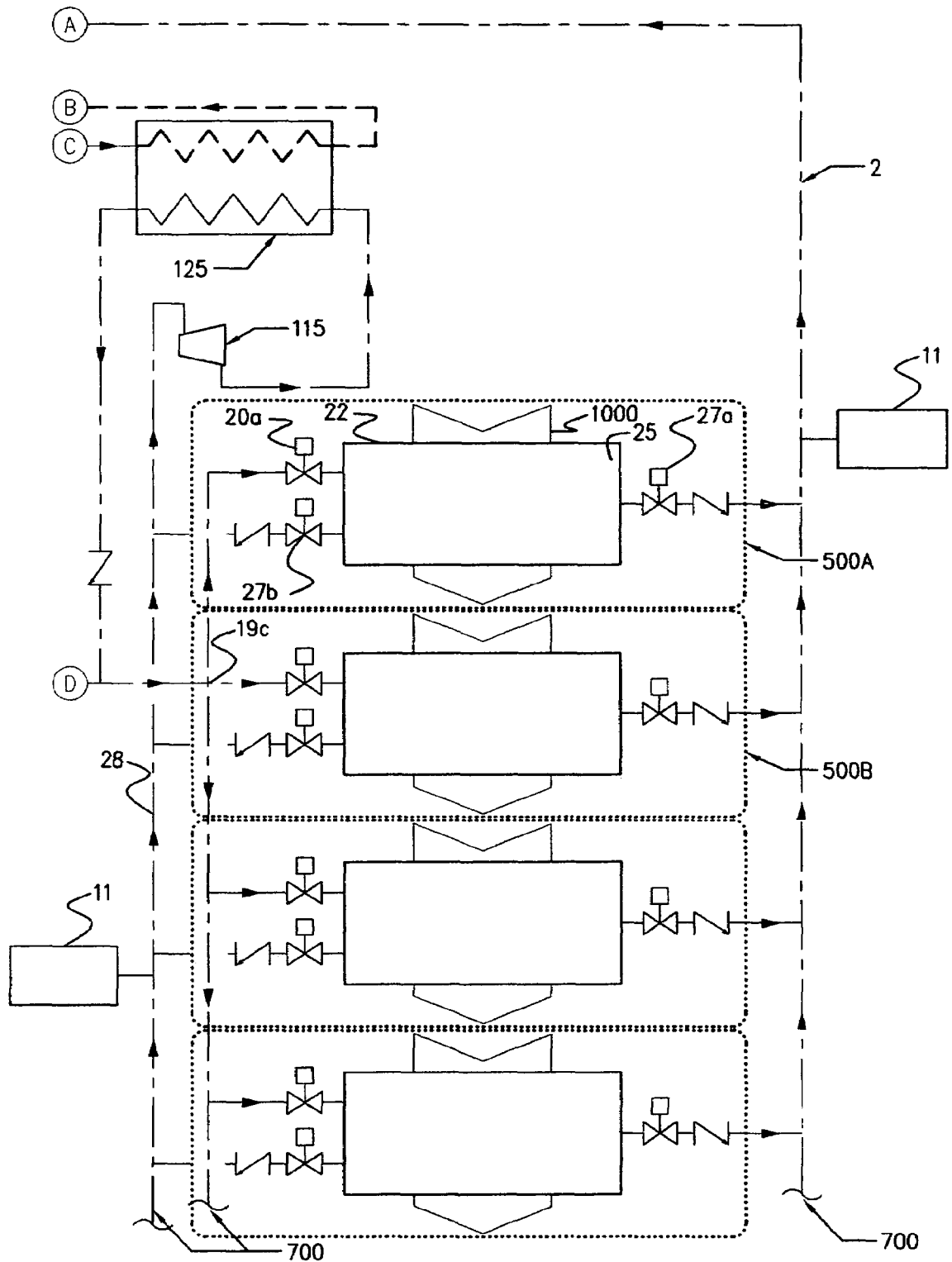
Figures 1, 3:
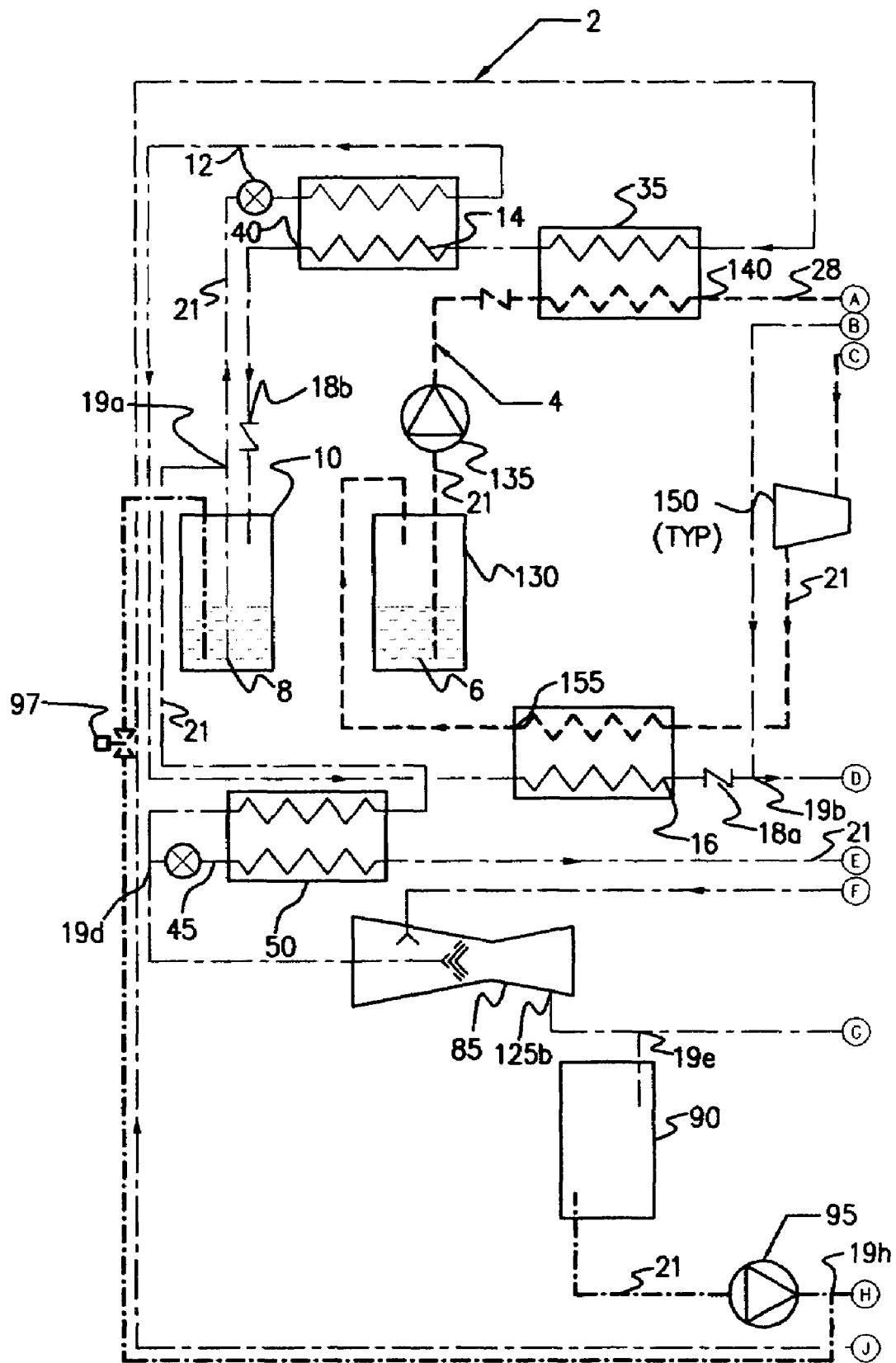
Figures 2, 3:
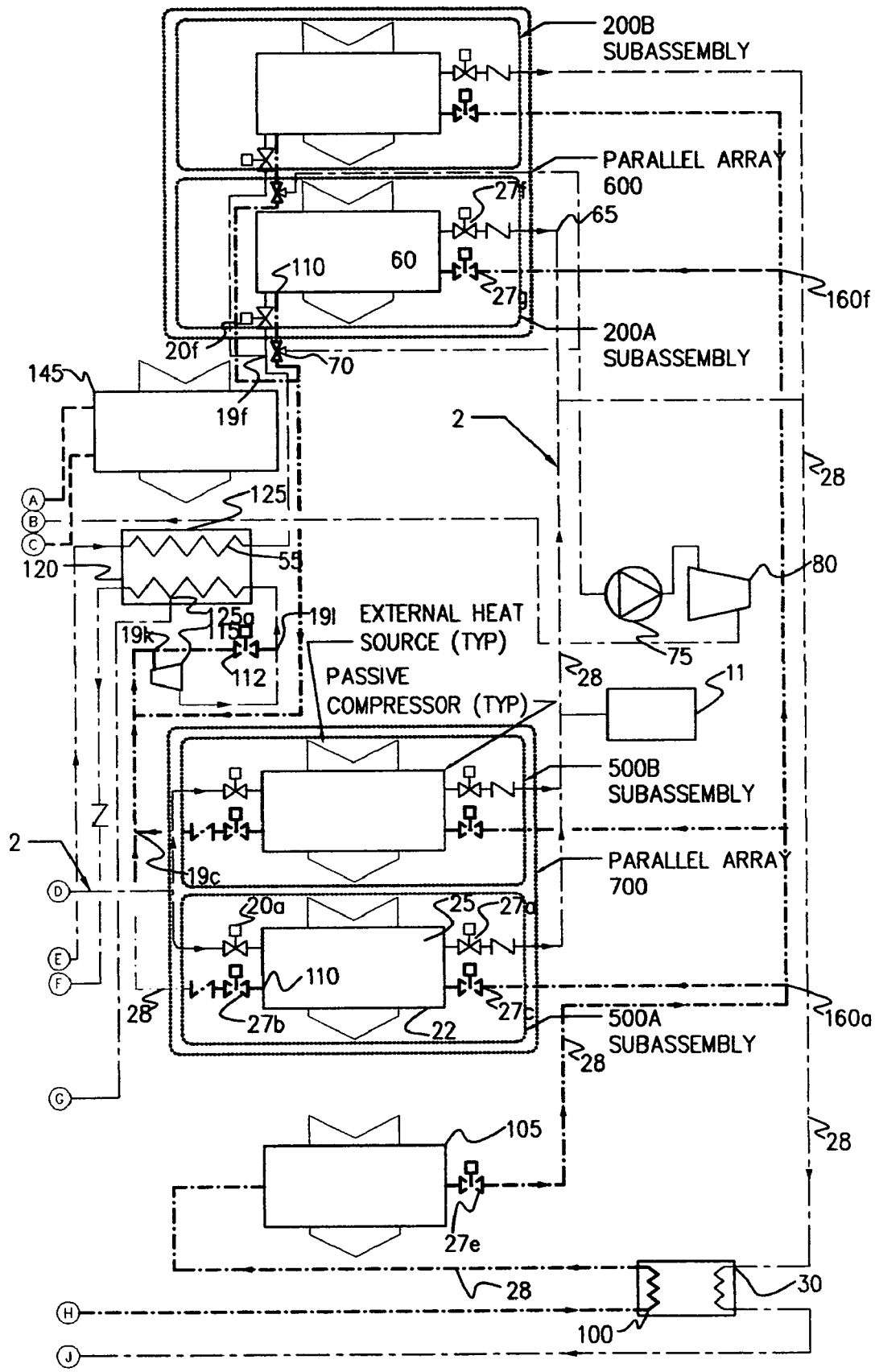

In other embodiments, in a passive parallel compressor/superheater/Thermal Isovolumetric Pressurizer assembly, depicted in FIG. 2-1, FIG. 2-2, FIG. 3-1 and FIG. 3-2 can be enhanced by following check valve 18a, with a connection to a passive parallel compressor superheater subassembly/Thermal Isovolumetric Pressurizer 500A, which comprises of a tee 19c, to a cryogenic automated isolation valve 20a, as the cold vapor supply entering the vapor compression super heater 22 exiting via a high pressure regulator valve 27a, and a high pressure regulator valve 27b. The subassembly 500A, can be interconnected in parallel with an indefinite number of other parallel compressor superheater subassemblies 500b, based on the pertinent scalable design forming a passive parallel array 700.

In other embodiments, in a passive parallel compressor superheater assembly, depicted in FIG. 2-1, FIG. 2-2, FIG. 3-1 and FIG. 3-2 can be enhanced by following check valve 18a, with a connection to a passive parallel compressor superheater subassembly 500A, which comprises of a tee 19c, to a cryogenic automated isolation valve 20a, as the cold vapor supply entering the vapor compression super heater 22 exiting via a high pressure regulator valve 27a, and a high pressure regulator valve 27b. The subassembly 500A, can be interconnected in parallel with an indefinite number of other parallel compressor superheater subassemblies 500b, based on the pertinent scalable design forming a passive parallel array 700.

In operation, this embodiment can facilitate the simultaneous compression/pressurization and superheating of several parallel circuits. Accordingly, constant pressure and temperature may always be available for feeding the remaining portion of the circuit and its pertinent functions. This methodology also prevents any time deference and/or pulsations that could be attributed to inconsistent heat transfer, and the like.

In operation, superheating and/or compression/pressurization is accomplished by the filling of superheater 22, with the slightly superheated medium 8 but still in a cold vapor state. Heat is then added from the external heat source which increases the temperature and pressure of medium 8, within the fixed volume of superheater 22, in thermal conductive contact with external heat source 1000. This heat absorption will occur until predetermined parameters are reached and valve 27a, then releases medium 8. This design can facilitate the simultaneous compression/pressurization and superheating of several parallel circuits. Hence, constant pressure and/or temperature can always be available for feeding the remaining portion of the circuit and its pertinent functions. Expansion tank(s) can be incorporated to prevent any time deference and/or pulsations that could be attributed to inconsistent heat transfer, and/or isolation of the superheater 22, and the like.

As depicted in FIG. 2-1 and 3-1, the Rankine Cycle, in the preferred embodiment can be enhanced by following the Rankine cycle liquid receiver 130, with a Rankine cycle cryogenic liquid pump 135, that can be driven by any fixed speed, multiple speed, and/or variable frequency motor (but external power sources will not be necessary for its energy input), that discharges into Rankine cycle evaporator 140.

In operation this embodiment can facilitate a controlled/adjustable liquid flow within the Rankine cycle and thereby directly and/or indirectly effect and control the medium flow and heat transfer rates within the entire system and allow adjustments as needed.

As depicted in FIGS. 3-1 and 3-2, the vapor compression cycle can be modified to include a blowdown cycle that can begin by a modification of the preferred embodiment that can begin with the vapor compression liquid receiver 10, being connected to a vacuum insulated tee fitting 19a, with one branch of the array of vacuum insulated piping and appurtenances leading to the vapor compression expansion valve 12, through pipe 21, into the vapor compression stage 1 subcooler 14, out via pipe 21, into the vapor compression evaporator 16, which is in thermally conductive contact with the Rankine condenser 155. The flow then exiting to a connection with a vacuum insulated check valve 18a followed by a tee 19b and continuing with the same branched circuit to a passive parallel compressor superheater subassembly 500A which may include another tee 19c to the cryogenic automated isolation valve 20a as the cold vapor supply. The High Pressure minimal or not insulated tee 160a, is operably connected to the high pressure regulator valve 27 C, as a high pressure blowdown superheated gas supply entering the vapor compression super heater 22, in thermal conductive contact with external heat source 1000, and exiting via a high pressure regulator valve 27a, and a high pressure regulator valve 27b. The subassembly 500A, can be interconnected in parallel with an indefinite number of other parallel compressor superheater subassemblies 500B, based on the pertinent scaleable design forming a passive parallel array 700. The interconnected array 700, is exited through a minimal or non-insulated high-pressure piping and appurtenances 28, to a vapor compression pre-condenser 30, via more piping 28. The flow continues to the vapor compression condenser 35, which is in thermally conductive contact with a Rankine cycle evaporator 140, as a subassembly to a cryogenic shell and tube/tube and tube heat exchanger and back through the subcooler 14, through a check valve 18b, and into the receiver 10. The actual blowdown cycle can begin at a blowdown liquid receiver 90, supplying via pipe 21, a blowdown cryogenic liquid pump 95, this can be driven by any fixed speed, multiple speed, and/or variable frequency motor, but external power sources will not be necessary for its energy input, that discharges through one branch of tee 19h, into a blowdown evaporator coil 100, which is in thermally conductive contact with the vapor compression precondenser 30, as a subassembly to a cryogenic shell and tube/tube and tube heat exchanger connected through the pipe 28, to a blowdown super heater 105. The high pressure regulator valve 27e, is connected to a passive parallel array 600 and 700, which are exited through a blowdown mixed gas outlet 110, to bottleneck through one branch of a tee 19k, into a blowdown expansion engine 115, preferably discharges into a blowdown vacuum condenser coil 120. The vapor outlet of coil 120, can be entrained via pipe 21, by the vacuum suction side of an optional vacuum diffusion ejector 85. A blowdown condenser which is in thermally conductive contact with a blowdown vacuum evaporator 55, as a subassembly to a cryogenic shell and tube heat exchanger. liquid outlet 125a, can be adjoined with a vacuum diffusion ejector liquid outlet 125b through more of pipe 21, at tee 19e, with the remaining branch leading back to the receiver 90. The other branch of tee 19h, can lead to a blowdown liquid pump bypass regulating valve 97, continuing though more of pipe 21, to terminate into the bottom of the vapor compression liquid receiver 10. The other branch of tee 19k, preferably detours through a blowdown vacuum engine bypass valve 112, and to the discharge side of engine 115 at tee 191.

In FIGS. 3-1 and 3-2, to further support the efficient operation of the blowdown cycle, the vapor compression cycle can be further modified by adding a blowdown vacuum heat sink that can commence at the other branch of the tee 19a, that is routed with the vacuum insulated piping 21, through a blowdown stage 2 subcooler 50, to another vacuum insulated tee 19d. The flow continues with the same branched circuit to a blowdown expansion valve 45, back through subcooler 50, via more of the pipe 21, to enter a blowdown vacuum evaporator 55, which is in thermally conductive contact with the blowdown condenser coil sections 120, and 125a, as a subassembly to a tube heat exchanger, exiting to a passive parallel compressor superheater subassembly 200A, which can consist of another tee 19f, to a cryogenic automated isolation valve 20f, as the cold vapor supply and a high pressure minimally or not insulated tee 160f, connected to a high pressure regulator valve 27g, as a high pressure blowdown superheated gas supply entering a blowdown vacuum compressor superheater 60. One exit of superheater 60, can connect to an automated 3 way blowdown vacuum control valve 70, and another exit via a high pressure regulator valve 27f. The subassembly 200A, can be interconnected in parallel with an indefinite number of other blowdown vacuum parallel compressor superheater subassemblies 200B, and is based on the pertinent scaleable design forming another passive parallel array 600. The interconnected array 600, can be exited through several channels. One being valve 70 with one branch leading through pipe 21, to a blowdown vacuum cryopump 75, joined to the suction side of a blowdown vacuum compressor 80, with its discharge side connected to pipe 21, that can complete the circuit via the connection to the previously unmentioned branch of Tee 19b. The other branch of tee 19d, can travel through more of pipe 21, to terminate as the high pressure side of the optional liquid entrainment blowdown vacuum diffusion ejector 85.

Seen in FIGS. 3-1 and 3-2, is another embodiment of the Rankine cycle. The Rankine cycle starts at a Rankine cycle liquid receiver 130, supplying via pipe 21, the Rankine cycle cryogenic liquid pump 135, that discharges into a Rankine cycle evaporator 140, in thermally conductive contact with the vapor compression condenser 35, connected through the pipe 28, to a Rankine cycle superheater 145, and the external heat source, exiting via more of pipe 28 into the Rankine cycle expansion engine 150. Discharging through pipe 21 into the Rankine cycle condenser 155, which is in thermally conductive contact with the Vapor Compression Evaporator 16, and back to the receiver 130.

This broadened design can facilitate a controlled/adjustable liquid, vapor and/or gas flow within all cycles of the entire system. The blowdown cycle and blowdown vacuum heat sink is one method, among many others using the present invention, that can produce any pressure and enthalpy conditions desired within any and all sections of the entire system. The blowdown expansion engine also can provide additional net work output.

Figures 1, 4:
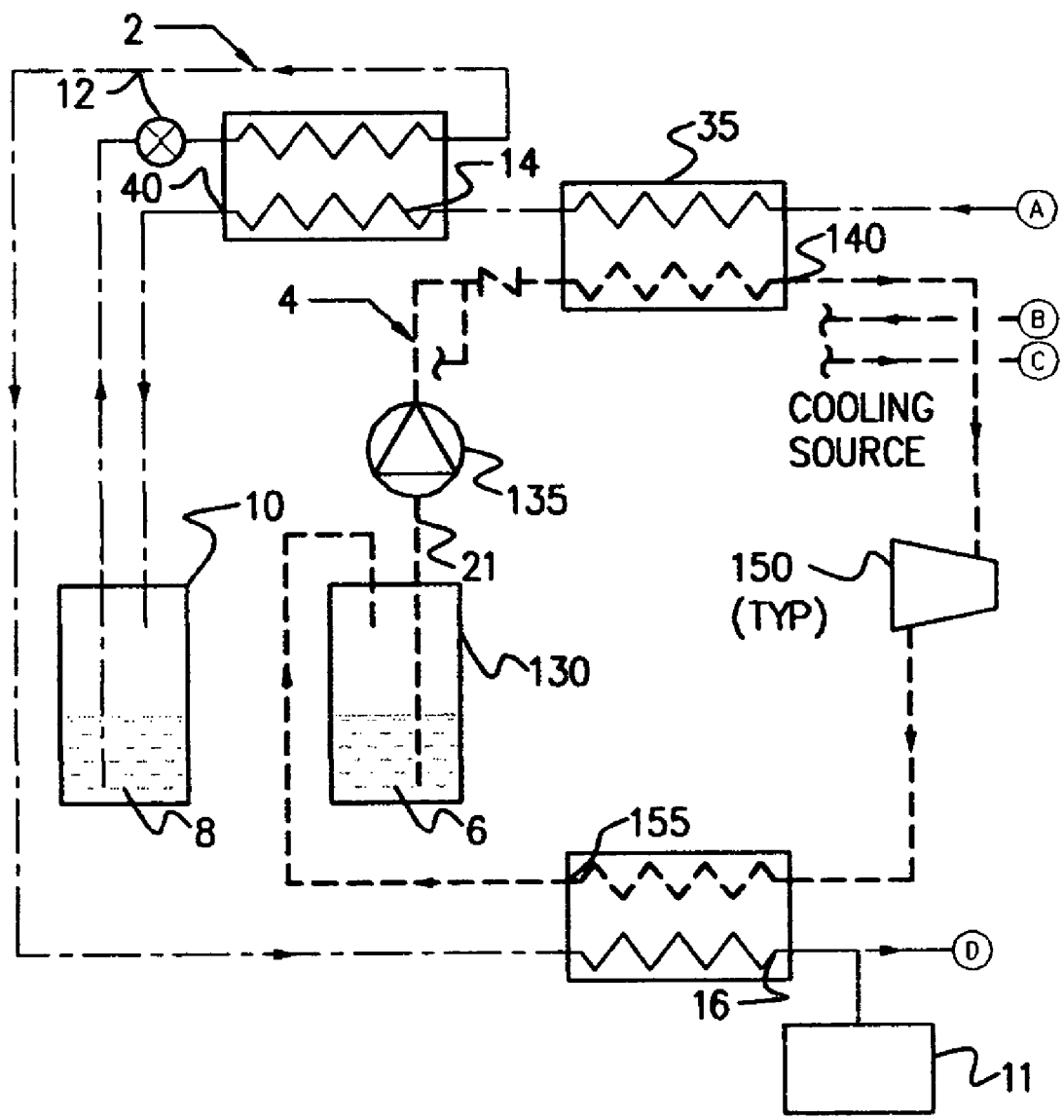
Figures 2, 4:
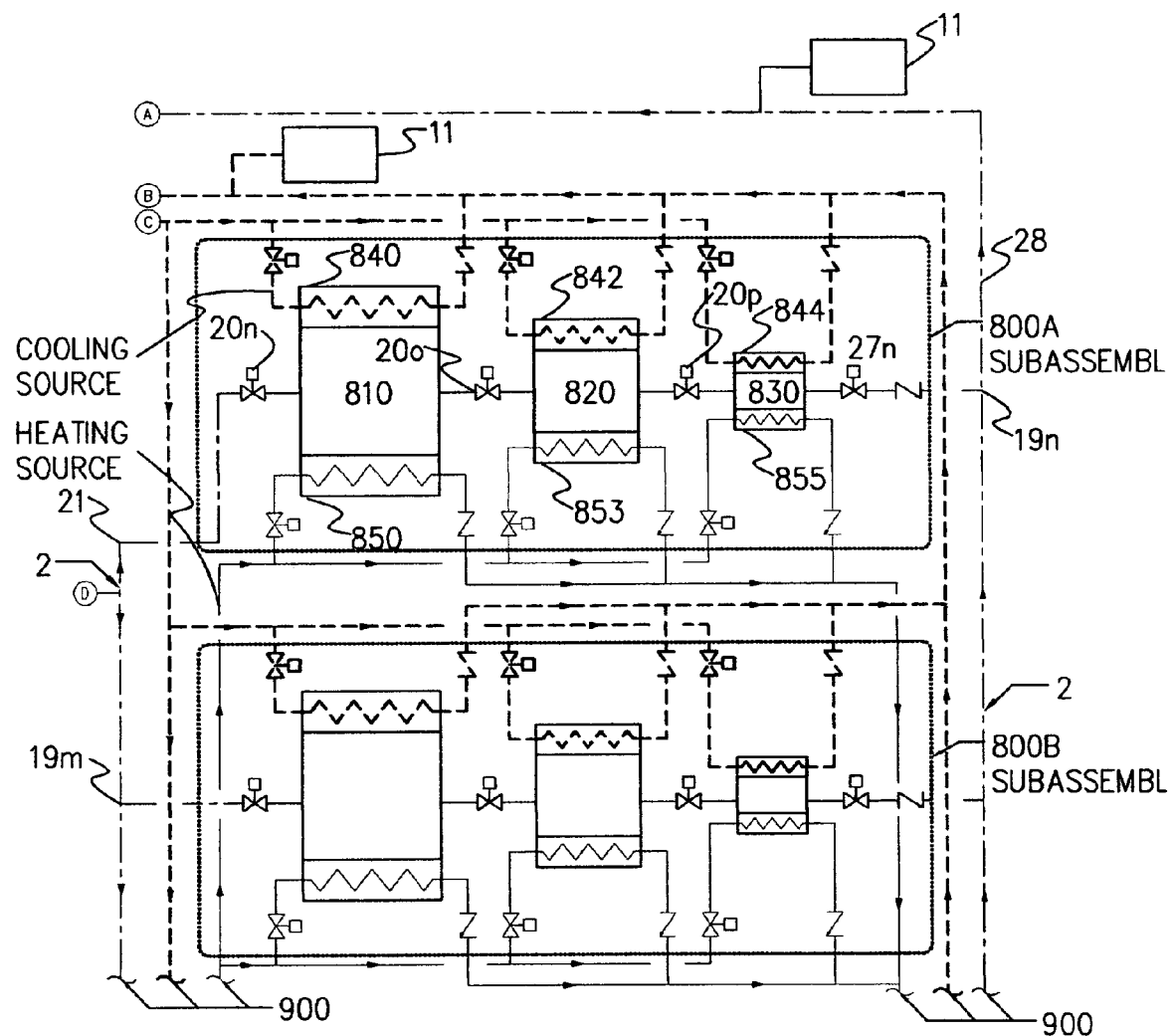

In FIGS. 4-1 and 4-2 depicts a slightly superheated cold vapor of medium 8, exiting the evaporator 16, through one branch of tee 19m into a passive parallel reducing volume compressor subassembly 800A comprising of the path through valve 20n into an isoexo thermal vessel 810 (in thermally conductive contact with a cooling flow inducing heat exchanger 840 and a heating flow inducing heat exchanger 850) through a valve 20o into another isoexo thermal vessel 820, preferably in thermally conductive contact with a cooling flow inducing heat exchanger 842, and a heating flow inducing heat exchanger 853, through valve 20p. It then passes into another isoexo thermal vessel 830, preferably in thermally conductive contact with a cooling flow inducing heat exchanger 844, and a heating flow inducing heat exchanger 855, through valve 27n, into one branch of tee 19n, and through pipe 28, to condenser 35, preferably in thermally conductive contact with the Rankine cycle liquid evaporator 140. It then passes through pipe 21, into the subcooler 14 exiting into the receiver 10 through valve 12 and back to the evaporator 16. The subassembly 800A can be interconnected in parallel with an indefinite number of other passive parallel reducing volume compressor subassemblies 800B, based on the pertinent scalable design forming a passive parallel reducing volume compressor array 900.

As depicted in FIGS. 4-1 and FIG. 4-2, the Vapor Compression Cycle within the Preferred Embodiment can be enhanced by interacting with a sequenced isothermal and exothermal process utilized by a Passive Parallel Reducing Volume Compressor Array 900 for the flow induction, compression and/or superheating of any refrigerant medium. This process may produce a broadened scope of pressure and enthalpy conditions.

Figures 1, 5:
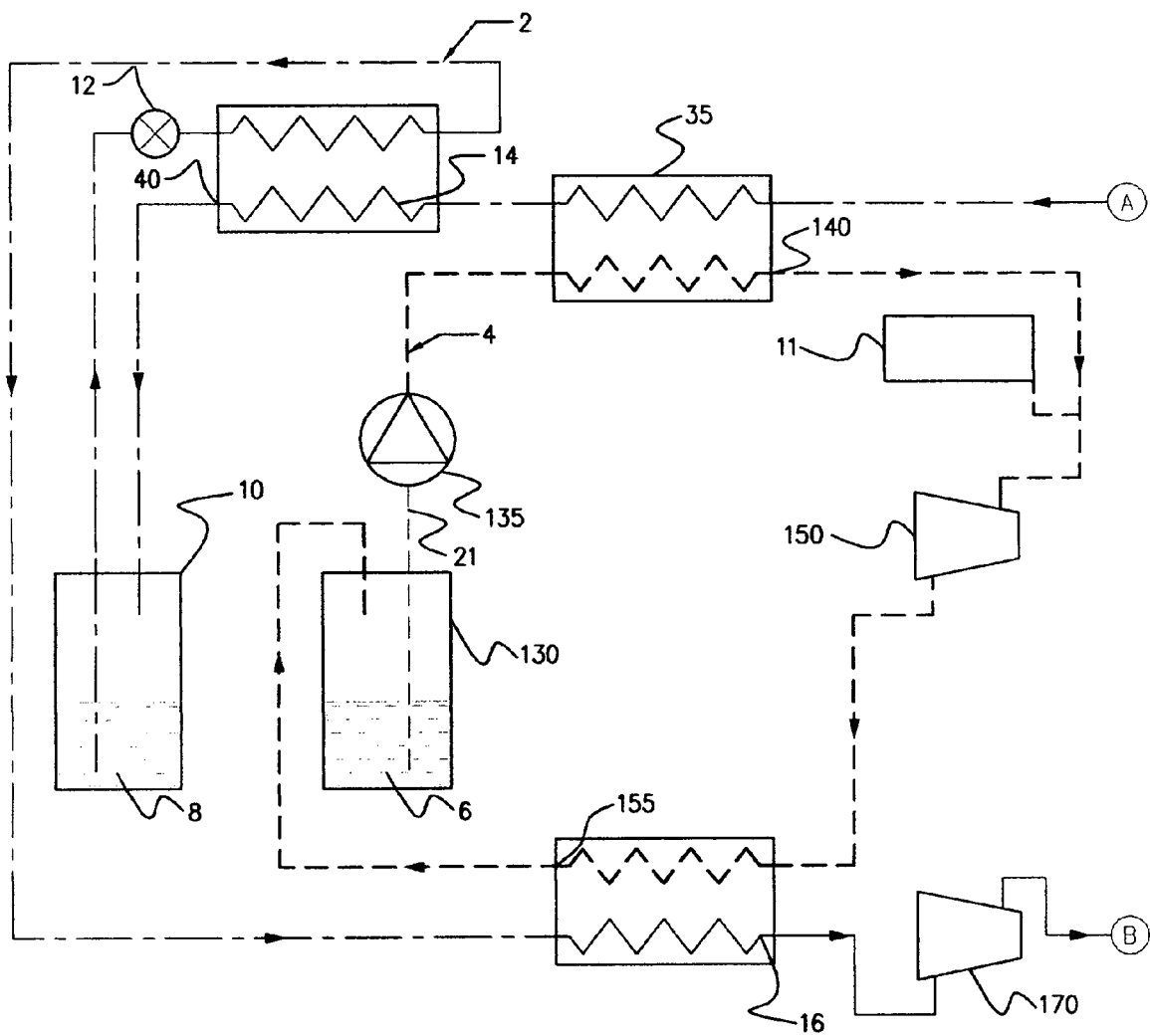
Figures 2, 5:
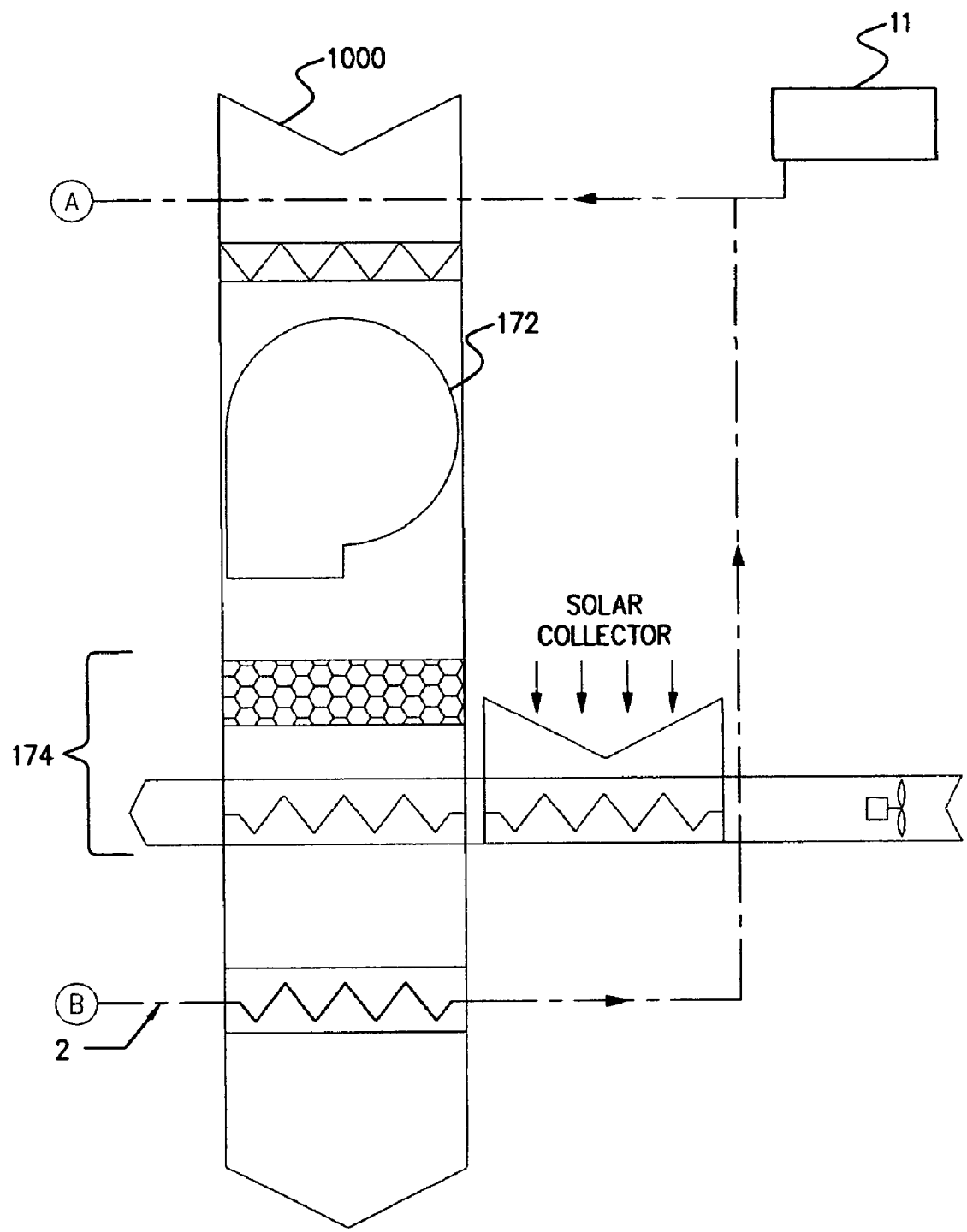

In FIGS. 5-1 and 5-2 show an optional embodiment including the vapor compression cycle and/or the Rankine Cycle utilizing a motorized mechanical driven compressor 170, and motorized mechanical driven blower 172, for flow circulation. FIG. 5-2 also includes an optional desiccant dehumidification system 174, that can regenerate via the use of an optional solar collector array.

It is seen that with the proposed invention, the environment is safe from emissions, hazardous waste, flooding of valuable property and no particular geographic location is necessary. This system will consume no water, no fuel, no storage, no chemical treatment and is not dependant on weather conditions. Additional advantages are that this system:

- can be an integrated dual cycle closed loop system that generates power/mechanical energy without emitting any gases to the atmosphere.
- can be a system that does not directly and/or indirectly consume and deplete scarce/non-renewable energy resources for its operation and will also provide the opportunity for society to be independent of consumable resources.
- can provide a natural convection thermosiphonic iso/exothermal compression process in the vapor compression cycle requiring only free thermal energy input to achieve the necessary work. So after a substantial amount of the free thermal energy is converted to work, the residual sensible and latent heat energy and the refrigerant medium can be recycled as it is condensed from the vapor and/or gas state back into the liquid state. Thereby conserving the energy and preventing and eliminating society's dependency on the existing expensive consumable energy infrastructure.

An avionic lifting system may also be utilized in another embodiment. Any of the above embodiments can utilize any of the compressor/superheater subassemblies mentioned herein, but are not limited to just the methods described herein. Any method to cool air can be used to increase the density of the atmospheric air surrounding a vessel containing a buoyant medium; such as helium. The buoyant vessel's lifting capacity can be significantly increased as a result of the increased density difference between the buoyant medium in the vessel and the increased density of the surrounding air. This technology is capable of replacing existing rotorcraft by decreasing diameters of propellers and/or rotors.

As is evident from the above description, a wide variety of applications, methods, and systems may be envisioned from the disclosure provided. The apparatus and methods described herein are applicable in numerous applications, for example, the external heat source may be solar, geothermal, air conditioning loads, research systems, avionic, topping cycles, refrigeration, cogeneration, cryogenic applications, and additional advantages and modifications will readily occur to those skilled in the art. For example, the exterior heat source absorption can be located as a front surface area to be exposed in the front of an automobile. This surface area could be reduced by recovering residual heat from friction producing assemblies throughout the vehicle. This is a very feasible possibility. The proposed invention system can also be modified and incorporated to power and propel this same vehicle. Modified versions of this conception can be applied to trucks, trains, ships, planes, etc. Scalable electrical generators, compressors, etc. can be coupled with the proposed system(s) shafts of the expansion engines. Further, the subject technology can be utilized in cryogenic applications for liquefaction of gases such as nitrogen, hydrogen, helium, methane, water etc; laboratory and semiconductor applications, and medical applications (such as cryronics, etc). which eliminate the expensive costs of electricity consumption that is presently needed for existing systems. The Subject technology can also partner with existing renewable energy projects such as solar, bio-mass, geo-thermal, etc. to infinitely and competitively increase their capacity to far exceed the capacities of existing fossil fuel power generation facilities. This new technology will also eliminate any heat sources and noise sources that can be detected by the enemy and anti-aircraft weaponry such as the stinger missile. Further, additional topping cycles and bottom cycles that can comprise of different refrigerant mediums can also be cascaded with this system. The invention in its broader aspects is, therefore, not limited to the specific details, representative apparatus and illustrative examples shown and described. Accordingly, departures from such details may be made without departing from the spirit or scope of the applicant's general inventive concept.

The invention claimed is:

1. A cryogenic cogeneration method for converting energy from a heat source, through a cryogenic heat transfer process, into mechanical and/or electrical energy, comprising:

utilizing a vapor compression cycle to absorb heat from said heat source wherein the vapor compression cycle includes a vapor compression evaporator and at least one subassembly wherein the subassembly includes a heat transfer medium therein;

utilizing the heat source to heat the medium whereby the medium stays at a substantially fixed volume;

utilizing a Rankine cycle in conjunction with the vapor compression cycle, for converting thermal energy to mechanical and/or electrical energy wherein the Rankine cycle includes a condenser;

transferring latent thermal energy to and from said vapor compression cycle and said Rankine cycle via a heat exchanger wherein the heat exchanger includes the vapor compression evaporator and the condenser, in a simultaneous fashion; and utilizing a substantial portion of said mechanical and/or electrical energy to provide power to an external workload.

2. The method of claim 1, wherein said Rankine cycle includes utilizing means for conversion of thermal energy into mechanical and/or electrical energy, including energy absorption and rejection means to transfer substantial thermal energy from said heat source to said Rankine cycle, and recycling means for transfer of thermal energy to and from said vapor compression cycle.

3. The method of claim 1, further including utilizing said vapor compression cycle with energy absorption and rejection means for transfer of thermal energy from said heat source to said Rankine cycle and/or for transfer of energy via transfer to and from said Rankine cycle.

4. The method of claim 1, further including utilizing a heat transfer medium in said Rankine cycle.

5. The method of claim 1, further including utilizing a refrigerant in said Rankine cycle.

6. The method of claim 1, wherein the heat transfer medium comprises a refrigerant.

7. The method of claim 4, further including utilizing a thermosiphonic flow stimulated by gravity and natural convection to circulate said heat transfer medium.

8. The method of claim 5, further including utilizing a thermosiphonic flow stimulated by gravity and natural convection to circulate said refrigerant.

9. The method of claim 1, further including utilizing a thermosiphonic flow stimulated by gravity and natural convection to circulate said heat transfer medium.

10. The method of claim 6, further including utilizing a thermosiphonic flow stimulated by gravity and natural convection to circulate said refrigerant.

11. The method of claim 1, further including utilizing means to compress and/or superheat a heat transfer medium and/or refrigerant by passive natural isothermal and/or exothermal processes.

12. The method of claim 1, further including utilizing means for maintaining a predetermined continuous constant pressure output and/or flow through a sequenced method of simultaneous and/or parallel implementation of passive natural isothermal and/or exothermal processes, using the at least one subassembly.

13. The method of claim 1, further including utilizing means for broadening both range and control of pressures and/or flows using a blowdown cycle.

14. The method of claim 13, further including utilizing one or more blowdown expansion engines in said blowdown cycle as a means of reducing pressure in said parallel passive compressors while recovering/converting some residual energy.

15. The method of claim 1, further including utilizing means for broadening both range and control of pressures and/or flows using parallel passive volume reduction compressors.

16. The method of claim 1, further including utilizing means to increase a buoyant vessel lifting capacity using avionic lifting means.

17. The method of claim 13, further including utilizing means for broadening said range and control of pressures and/or flows by utilizing a volume reduction compressor.

18. The method of claim 14, further including utilizing a heat sink to further recover residual energy from said parallel passive compressors.

19. The method of claim 14, further including utilizing one or more pumps to enhance flow from said parallel passive compressors.

20. The method of claim 19, further including utilizing a vacuum diffusion ejector to further recover residual energy from and induce flow into said parallel passive compressors.

21. A cryogenic cogeneration apparatus for converting energy from a heat source, through a cryogenic heat transfer process, into mechanical and/or electrical energy, comprising:

vapor compression cycle means to absorb heat from said heat source wherein the vapor compression cycle means includes a vapor compression evaporator;

Rankine cycle means to absorb heat from said heat source, said Rankine cycle means for converting thermal energy to mechanical and/or electrical energy, said Rankine cycle means including a condenser, the Rankine cycle means being operatively linked to said vapor compression cycle means via the vapor compression evaporator;

means for transferring latent thermal energy to and from said vapor compression cycle and said Rankine cycle via a heat exchanger wherein the heat exchanger includes the vapor compression evaporator and the condenser, in a simultaneous fashion; and wherein a substantial portion of said mechanical and/or electrical energy is utilized to provide power to an external workload.

22. The apparatus of claim 21, wherein said vapor compressor cycle means includes a heat transfer medium.

23. The apparatus of claim 21, wherein said Rankine cycle means includes a heat transfer medium.

24. The apparatus of claim 21, wherein said vapor compressor cycle means includes a refrigerant.

25. The apparatus of claim 21, wherein said Rankine cycle means includes a refrigerant.

26. The apparatus of claim 22, further means for creating a thermosiphonic flow stimulated by gravity and natural convection to circulate said heat transfer medium.

27. The apparatus of claim 24, further including means for creating a thermosiphonic flow stimulated by gravity and natural convection to circulate said refrigerant.

28. The apparatus of claim 23, further including means for creating a thermosiphonic flow stimulated by gravity and natural convection to circulate said heat transfer medium.

29. The apparatus of claim 25, further including means for creating a thermosiphonic flow stimulated by gravity and natural convection to circulate said refrigerant.

30. The apparatus of claim 21, further including means to compress and/or superheat a heat transfer medium and/or refrigerant by passive natural isothermal and/or exothermal processes.

31. The apparatus of claim 21, further including means for maintaining a predetermined continuous constant pressure output and/or flow through a sequenced method of simultaneous and/or parallel implementation of passive natural isothermal and/or exothermal processes, using the at least one subassembly.

32. The apparatus of claim 21, further including means for broadening both range and control of pressures and/or flows using a blowdown cycle.

33. The apparatus of claim 32, further including utilizing one or more blowdown expansion engines in said blowdown cycle as a means of reducing pressure in said parallel passive compressors while recovering/converting some residual energy.

34. The apparatus of claim 33, further including utilizing a heat sink to further recover residual energy from said parallel passive compressors.

35. The apparatus of claim 33, further including utilizing one or more pumps to enhance flow into/from said parallel passive compressors.

36. The apparatus of claim 35, further including utilizing a vacuum diffusion ejector to further recover residual energy from and induce flow into said parallel passive compressors.

37. The apparatus of claim 21, further including means for broadening both range and control of pressures and/or flows using a blowdown vacuum heat sink.

38. The apparatus of claim 21, further including means for broadening both range and control of pressures and/or flows using parallel passive volume reduction compressors.

39. The apparatus of claim 21, further including means to increase a buoyant vessel lifting capacity using avionic lifting means.

40. The apparatus of claim 32, further including means for broadening said range and control of pressures and/or flows by utilizing a volume reduction compressor.

41. The apparatus of claim 21, further including a motorized mechanical driven compressor and motorized mechanical driven blower, for flow circulation.

42. A thermal source cogeneration method for converting energy from a heat source, through a heat transfer process, into mechanical and/or electrical energy, comprising:
    utilizing a vapor compression cycle to absorb heat from said heat source wherein the vapor compression cycle includes a vapor compression evaporator;
    utilizing a Rankine cycle in conjunction with the vapor compression cycle, the Rankine cycle including a condenser, for converting thermal energy to mechanical and/or electrical energy;
    transferring latent thermal energy to and from said vapor compression cycle and said Rankine cycle via a heat exchanger wherein the heat exchanger includes the vapor compression evaporator and the condenser, in a simultaneous fashion; and
    utilizing a substantial portion of said mechanical and/or electrical energy to provide power to an external workload.

43. The method of claim 42, further including utilizing means for broadening both range and control of pressures and/or flows using a blowdown cycle, and further utilizing means for conversion of thermal energy into mechanical and/or electric energy using an expansion engine.

44. The method of claim 43, further including utilizing means for re-introducing the blowdown cycle heat transfer medium into a vapor compression cycle for conversion of thermal energy into mechanical and/or electric energy using an expansion engine and a blowdown heat sink.

45. The method of claim 42 further including utilizing said mechanical and/or electric energy for the liquification and/or liquefaction of at least one of nitrogen, air, hydrogen, helium, water vapor/steam, helium, methane, carbon dioxide.

46. The method of claim 42 wherein said heat source comprises thermal friction producing assemblies and/or surfaces.

47. The method of claim 42 wherein said heat source comprises renewable energy sources, said renewable energy sources comprising at least solar thermal, geo-thermal and bio-mass thermal.

48. The method of claim 42 further including utilizing said mechanical and/or electric energy to propel at least compressors, electrical generators and transmissions.

49. A thermal source cogeneration apparatus for converting energy from a heat source, through a heat transfer process, into mechanical and/or electrical energy, comprising:
    vapor compression cycle means to absorb heat from said heat source wherein the vapor compression cycle means includes a vapor compression evaporator;
    Rankine cycle means to absorb heat from said heat source, said Rankine cycle means for converting thermal energy to mechanical and/or electrical energy, said Rankine cycle means including a condenser, the Rankine cycle means being operatively linked to said vapor compression cycle means via the vapor compression evaporator;
    means for transferring latent thermal energy to and from said vapor compression cycle and said Rankine cycle via a heat exchanger wherein the heat exchanger includes the vapor compression evaporator and the condenser, in a simultaneous fashion; and
    wherein a substantial portion of said mechanical and/or electrical energy is utilized to provide power to an external workload.

50. The method of claim 1 wherein transferring latent thermal energy to and from said vapor compression cycle and said Rankine cycle in a simultaneous fashion further comprises utilizing at least two heat exchangers between the vapor compression cycle and said Rankine cycle as a means for said latent thermal energy transfer.

51. The apparatus of claim 21 wherein the energy transfer means comprises at least two heat exchangers between the vapor compression cycle and said Rankine cycle.

52. The method of claim 42 wherein transferring latent thermal energy to and from said vapor compression cycle and said Rankine cycle in a simultaneous fashion further comprises utilizing at least two heat exchangers between the vapor compression cycle and said Rankine cycle as a means for said latent thermal energy transfer.

53. The apparatus of claim 49 wherein the energy transfer means comprises at least two heat exchangers between the vapor compression cycle and said Rankine cycle.

* * * * *